Patented May 5, 1953

2,637,753

UNITED STATES PATENT OFFICE 2,637,753

PROCESS FOR CHLORINATING NATURAL RUBBER

Jerome Been and Martin M. Grover, Rutherford, N. J., assignors to Rubber and Asbestos Corporation, Bloomfield, N. J., a corporation of New Jersey No Drawing. Application June 16, 1951, Serial No. 232,061

7 Claims. (Cl. 260—772)

This invention relates to chlorinated derivatives of rubber. In particular it relates to novel products and processes wherein natural rubbers are depolymerised to a permanently liquid state and then chlorinated.

Commercially available chlorinated rubber derivatives are usually prepared by digesting pieces of rubber with water in an autoclave, transferring the solid product to a cracking mill for mastication and drying, dissolving the dried rubber to a 5% solution in carbon tetrachloride, and then passing in chlorine until the desired extent of chlorination has taken place. However, such processes are complex and costly. Further, it is difficult to prepare by present methods chlorinated rubber derivatives which will form high solids, low-viscosity solutions.

One object of this invention is to provide novel chlorinated derivatives of natural rubber. Another object of this invention is to provide new, simple and economical methods for the preparation of chlorinated derivatives of natural rubber. A still further object of this invention is to provide chlorinated rubber derivatives which will form high solids, low viscosity solutions.

We have discovered that if rubber is heated above 400 degrees F. until permanently liquid and then either chlorinated directly or made up to high concentrations in a fully chlorinated hydrocarbon solvent and then chlorinated, chlorinated rubber derivatives are obtained which are comparable in solubility, chlorine content, viscosity and stability to commercial low-viscosity chlorinated rubbers. Thus, we have found that we can prepare chlorinated rubber derivatives as stable 20% solutions in toluene having a viscosity below 5 centipoises. Such low viscosity products can be used as fortifiers for alkyd resins in protective coating formulations and as film formers for chemical-resistant and fire-proof coatings. With the products of our invention higher solids lacquers can be made than with any commercially available chlorinated rubbers. Our products are also useful in the formulation of adhesives.

The initial step in our process is to prepare the heat-liquefied rubber. Practically any grade of natural rubber free from sand and bark may be used. The rubber is cut up into small pieces and placed in a kettle or other vessel whose temperature can be controlled and which has a fume hood for removal of volatiles. Preferably a direct fired or circulating oil kettle made of Chromax or other similar alloy and equipped with positive scraping agitation should be used. The temperature of heating is selected from the range 400–625 degrees F. according to the viscosity of the desired end product, with lower-viscosity products being produced at the higher temperatures. Close control of temperature is important for product uniformity. Catalysts for the reaction are useful since they increase the rate of liquefaction. Suitable catalysts include peroxides such as benzoyl peroxide and substituted naphthalene such as DuPont's "RPA" and Cyanamid's "Pepton." After heating for several hours the rubber becomes liquid, because of depolymerisation, and remains permanently liquid when cooled. Over-heating will give a hard brittle product rather than a liquid, due to resinification.

The heat-liquefied rubber can then be chlorinated by either direct chlorination with chlorine, sulfuryl chloride or thionyl chloride at a moderate temperature, or by dissolving to a high concentration in a fully chlorinated hydrocarbon solvent such as carbon tetrachloride and then chlorinating with chlorinating agents such as chlorine, sulfuryl chloride and thionyl chloride.

Treating the heat-liquefied rubber directly with chlorine in the presence of zinc chloride as a catalyst gives a rubbery chlorinated product. Dissolving to a high concentration in carbon tetrachloride and then bubbling in chlorine will readily give granular chlorinated products. The third method, reacting the liquid rubber with sulfuryl or thionyl chloride in the presence of a catalyst such as benzoyl peroxide also gives granular chlorinated products. The low viscosity chlorinated rubbers produced by the above processes are relatively dark-colored, stable economically-made products which are particularly suitable for protective coatings applications and in adhesives.

As an example of this invention smoked sheet rubber is cut up into small pieces and placed in a cast steel kettle heated by circulating oil and equipped with a vapor hood. After heating for several hours with a small amount of benzoyl peroxide at 500 degrees F. a somewhat dark liquid product is formed which remains liquid after cooling, while about 10% in the form of volatiles goes up the hood. These volatiles represent primarily the resinous, nitrogenous and moisture content of the original rubber. The liquefied rubber, after cooling, is now ready for chlorination.

Three hundred twenty (320) grams of this heat-liquefied rubber is dissolved in an equal weight of carbon tetrachloride and heated at 70 degrees centigrade under reflux with agitation. Chlorine is then introduced at a rate of two grams a minute and after ten minutes the temperature is raised to 83 degrees centigrade. This rate of chlorination is maintained for four hours and then decreased to one gram a minute for another six hours. The reaction is then stopped and the carbon tetrachloride recovered by steam distillation. The reaction product is washed with 5% aqueous solution of sodium bicarbonate and dried at 70 degrees centigrade for two hours. The resulting product is light brown and granular, with a specific gravity of 1.6. It is soluble in toluene and methyl-ethyl-ketone. Its viscosity as a 20% toluene solution at 25 degrees centigrade is six centipoises. It has a chlorine content of about 64%.

In another example a catalyst consisting of zinc chloride freshly fused on pumice is added to the carbon tetrachloride solution. This enables a product identical to the first example to be formed in half the time.

As a third example the following method of chlorination is used: 440 grams of sulfuryl chloride and one gram of benzoyl peroxide are charged into a two-liter Wolff flask having 440 R. P. M. anchor agitation and heated under reflux at 65 degrees centigrade. To this charge is added dropwise 140 grams of a solution consisting of 70 grams of heat-liquefied rubber dissolved in 70 grams of carbon tetrachloride, and the temperature of reaction is raised to 83 degrees C. The reaction proceeds vigorously. The reflux is maintained for four hours and then the carbon tetrachloride and the excess sulfuryl chloride are steam-distilled off. After washing with 5% aqueous sodium bicarbonate solution the product is heated at 75 degrees C. for two hours to give an end-product 95% soluble in toluene. The toluene-soluble portion as a 20% solution has a viscosity of 11 centipoises at 25 degrees C. The chlorine content is about 60%. Thionyl chloride, when substituted in an equivalent amount for the sulfuryl chloride, gives identical products. As a further alternative to this example, the liquefied rubber can be reacted directly with the sulfuryl or thionyl chloride, thus dispensing with the need for a solvent, provided there is sufficient agitation to maintain contact between the reactants.

It will be noted that the heat-liquefied rubber allows chlorination to be accomplished by use of either no solvent or much smaller amounts of solvent than hitherto known or described. One commercial process widely used at present requires 19 pounds of carbon tetrachloride per pound of rubber, thus necessitating expensive reflux and recovery system which still has loss of solvent. In our process only one pound of solvent need be handled per pound of rubber, and a much smaller amount of solvent is lost. This economy results from the fact that the heat-liquefied rubber as a 50% solution has about the same viscosity as a 5% solution of water-digested rubber prepared by other methods.

It should be further noted that our chlorinated rubber derivatives are viscosity-stable and do not lose chlorine upon heating to 180 degrees F.

In addition to smoked sheet Hevea rubber, practically any grade of clean commercial, natural rubber can be used as a starting material for such chlorinated derivatives, since purification occurs to a certain extent during the heating process. The term "natural rubber" is intended to include all the commercial grades of the Hevea, Castaloa, and guayule plants. The term "chlorinated" is intended to include products having any chlorine content. It is intended that the phrase, "consisting of a mass of solid natural rubber," as used in the appended claims, substantially exclude the presence of other ingredients such as water or fats except for possible small amounts of catalysts, as described above.

We claim:

1. A process for preparing chlorinated derivatives of natural rubber, in which a mass consisting of solid natural rubber is heated at a temperature of at least 400° F. until in a permanent liquid state and then reacted with a chlorinating agent selected from the group consisting of chlorine, sulfuryl chloride, and thionyl chloride.

2. A process for preparing chlorinated derivatives of natural rubber, in which a mass consisting of solid natural rubber is heated at a temperature of at least 400° F. until in a permanently liquid state and then reacted directly with a chlorinating agent selected from the group consisting of chlorine, sulfuryl chloride and thionyl chloride.

3. A process for preparing chlorinated derivatives of natural rubber, in which a mass consisting of solid natural rubber is heated at a temperature of at least 400° F. until in a permanently liquid state and then reacted directly with chlorine in the presence of zinc chloride.

4. A process for preparing chlorinated derivatives of natural rubber, in which a mass consisting of solid natural rubber is heated at a temperature of at least 400° F. until in a permanently liquid state, dissolved in a solvent, and then reacted with a chlorinating agent selected from the group consisting of chlorine, sulfuryl chloride, and thionyl chloride.

5. A process for preparing chlorinated derivatives of natural rubber, in which a mass consisting of solid natural rubber is heated at a temperature of at least 400° F. until in a permanently liquid state, dissolved in carbon tetrachloride and then reacted in the presence of benzoyl peroxide with a chlorinating agent selected from the group consisting of chlorine, sulfuryl chloride and thionyl chloride.

6. A process for preparing chlorinated derivatives of natural rubber, in which a mass consisting of solid natural rubber is heated at a temperature of at least 400° F. until in a permanently liquid state, dissolved in a fully chlorinated hydrocarbon solvent and then reacted in the presence of benzoyl peroxide with a chlorinating agent selected from the group consisting of chlorine, sulfuryl chloride, and thionyl chloride.

7. A process for preparing chlorinated derivatives of natural rubber, in which a mass consisting of solid natural rubber is heated at a temperature of at least 400° F. until in a permanently liquid state, dissolved in carbon tetrachloride and then reacted with sulfuryl chloride in the presence of benzoyl peroxide.

JEROME BEEN.
MARTIN M. GROVER.

References Cited in the file of this patent

UNITED STATES PATENTS

| Number | Name | Date |
| --- | --- | --- |
| 1,695,636 | Ellis | Dec. 18, 1928 |
| 1,919,111 | Kent | July 18, 1933 |
| 2,019,207 | Alexander | Oct. 28, 1935 |
| 2,040,460 | Becker et al. | May 12, 1936 |
| 2,401,194 | Schlenk | May 28, 1946 |
| 2,536,579 | Sommer | Jan. 2, 1951 |

FOREIGN PATENTS

| Number | Country | Date |
| --- | --- | --- |
| 305,968 | Great Britain | June 13, 1928 |
| 415,195 | Great Britain | Jan. 12, 1934 |
| 470,268 | Great Britain | Aug. 11, 1937 |

OTHER REFERENCES

J. Polymer Science, vol. 5, of 1950, pp. 653–666.